United States Patent [19]
Pickles

[11] 3,954,275
[45] May 4, 1976

[54] MACHINE TOOL CHUCKS
[75] Inventor: Kenneth Bailey Philip Pickles, Halifax, England
[73] Assignee: Pratt Burnerd International Limited, England
[22] Filed: Sept. 11, 1973
[21] Appl. No.: 396,133

[30] Foreign Application Priority Data
Sept. 13, 1972 United Kingdom............... 42495/72
Nov. 10, 1972 United Kingdom............... 52059/72

[52] U.S. Cl...................................... 279/4; 91/420; 277/75
[51] Int. Cl.²......................................... B23B 31/30
[58] Field of Search............. 279/4; 277/75; 92/106; 91/420

[56] References Cited
UNITED STATES PATENTS

| | | | |
|---|---|---|---|
| 1,785,349 | 12/1930 | Hopkins | 92/106 X |
| 1,934,411 | 11/1933 | Dahlman | 279/4 X |
| 2,509,673 | 5/1950 | Church | 279/4 |
| 3,169,777 | 2/1965 | Cull | 279/4 |
| 3,545,342 | 12/1970 | Hiestand | 92/106 |

*Primary Examiner*—Othell M. Simpson
*Assistant Examiner*—Z. R. Bilinsky
*Attorney, Agent, or Firm*—Stevens, Davis, Miller & Mosher

[57] ABSTRACT

A fluid pressure operated chuck is provided with a stationary slip ring mounted on an axially rotatable chuck body, and a resilient sealing ring is located in substantially opposed grooves in the slip ring and mounted therein by temporary deformation of the resilient sealing ring during fitting, in the absence of fluid pressure. The sealing ring may be of a squat "T" section with the flanges at the head of the T providing marginal edge parts for location in the opposed grooves and the broad base face of the stem of the T forming a sealing contact face. Valve means are also provided in the chuck body to control the fluid pressure which latter acts on an axially displaceable piston to operate the jaws of the chuck.

15 Claims, 6 Drawing Figures

MACHINE TOOL CHUCKS

This invention relates to fluid pressure operated chucks for machine tools.

A chuck of the type (hereinafter referred to as "the type specified") with which the present invention is concerned is often termed a self-contained power chuck in that it is a complete device basically comprising an axially displaceable piston in an axially rotatable chuck body, a set of work or tool gripping jaws which exhibit radial movement on the body to clamp or release a workpiece through intermediate means operated by the axial movements of the piston, and in which the fluid power for the piston passes to control valve means in the chuck body from a stationary slip ring mounted on the chuck body. The piston may be of the double acting type or of the type operated by fluid pressure in one direction and spring returned.

Since the chuck body must rotate relative to the stationary slip ring it is well known to incorporate in the slip ring sealing means. This sealing means becomes effective during passage of fluid (usually air) under pressure to the valve means for effecting movement of the piston and serves to alleviate loss of pressure by fluid leakage through the clearance between the slip ring and the valve body. Hitherto proposed sealing means have comprised clamped diaphragms which are partially displaced on the application of fluid pressure to effect sealing or sealing rings which are freely retained in the slip ring and are displaceable as a whole and deformed against the chuck body to effect sealing on the application of fluid pressure. However, for diaphragm seals the necessary clamping arrangements have proved both expensive and inconvenient and generally there is poor sealing contact by the displaced diaphragm while the displacement and deformation of the aforementioned sealing rings does not always provide the same sealing characteristics (particularly after prolonged use of the sealing rings).

It is an object of the present invention to provide a chuck of the type specified and having improved sealing means between the slip ring and chuck body.

According to the present invention there is provided a fluid pressure operated chuck of the type specified comprising a resilient sealing ring housed in an annular recess in the slip ring, said sealing ring having a sealing part with a central annular contact face which is to be forced under fluid pressure into face-to-face contact with the chuck body, and wherein the marginal peripheral edge parts of said sealing ring adjacent to said sealing part are secured relative to the slip ring.

The slip ring and chuck body may be arranged so that the sealing part of the sealing ring is displaced radially into face-to-face contact with an axially extending cylindrical face of the chuck body to effect sealing on the application of fluid pressure through the slip ring. In such case the sealing part will be located axially between the marginal edge parts of the sealing ring with the sealing contact face being of substantially cylindrical profile. Alternatively the slip ring and chuck body may be arranged so that the sealing part of the sealing ring is displaced axially into face-to-face contact with a radially extending face of the chuck body to effect sealing on the application of fluid pressure through the slip ring. In such latter case the sealing part will be located radially between the marginal edge parts of the sealing ring with the sealing contact face located in a substantially radial plane.

Preferably the sealing ring is secured in the annular recess of the slip ring by the marginal edge parts being located as a close fit in substantially opposed annular grooves in the slip ring; such grooves open into the annular recess and the sealing ring is deformed in its sectional shape during fitting and, by virtue of its resilience, springs its edge parts into engagement with the opposed grooves. In addition, or alternatively, the sealing ring may be secured in the annular recess of the slip ring by the marginal edge parts being adhesively secured to appropriate surfaces (which may be in the said opposed grooves) of the slip ring.

The sealing ring is preferably of squat T-section with the flanges at the head of the T providing the marginal edge parts and the broad base face of the stem of the T forming the sealing contact face. Alternatively, the sealing ring may be of rectangular section. The sealing ring can be secured to the slip ring so that its contact face normally (in the absence of fluid pressure) presents a concave annular profile to the chuck body, for example the sealing ring may be deformed to fit into, or adhesively secured in, an annular recess in the slip ring which comprises a dovetail cross-section so that the sealing ring normally assumes a substantially concavo-convex cross-sectional formation.

The slip ring may, and in many instances will, carry two sealing rings respectively located in two annular recesses through which fluid under pressure can flow from two seperate lines into the chuck body to the valve means for control of the piston.

In use the slip ring is held stationary during rotation of the chuck body and has an inlet for air for the or each fluid line and such inlet is adapted to receive an air connection from a feed pipe. The or each sealing ring has one or more small diameter holes for the passage of air to the control valve means in the chuck body for effecting operation of the chuck jaws, (and possibly air exhausting actions) and such holes can act as restrictors or throttles. When pressurised air is admitted from the slip ring fluid line to the chuck body (the latter being held stationary), pressure builds up behind the resilient sealing ring forcing its contact face into sealing abutment with the peripheral or other appropriate surface of the chuck body while its marginal edge parts remain secured to the slip ring. When air pressure in the slip ring is released prior to rotation of the chuck body, the natural tendency of the resilient sealing ring is to flex away from contact with the chuck body and provide clearance for free rotation of the chuck body relative to the slip ring. The aforementioned flexure of the sealing ring for clearance may be assisted by a small amount of compressed air escaping to atmosphere from the chuck body and acting on the sealing contact face of the sealing ring.

In the above mentioned construction in which the sealing ring usually assumes a concavo-convex cross-section curving into its annular recess, such cross section straightens as the ring moves into sealing contact with the chuck body under air pressure.

An example of a suitable resilient material for the sealing ring is "Neoprene" rubber.

Embodiments of the present invention will now be described, by way of example only, with reference to the accompanying illustrative drawings in which.

Figure 1:
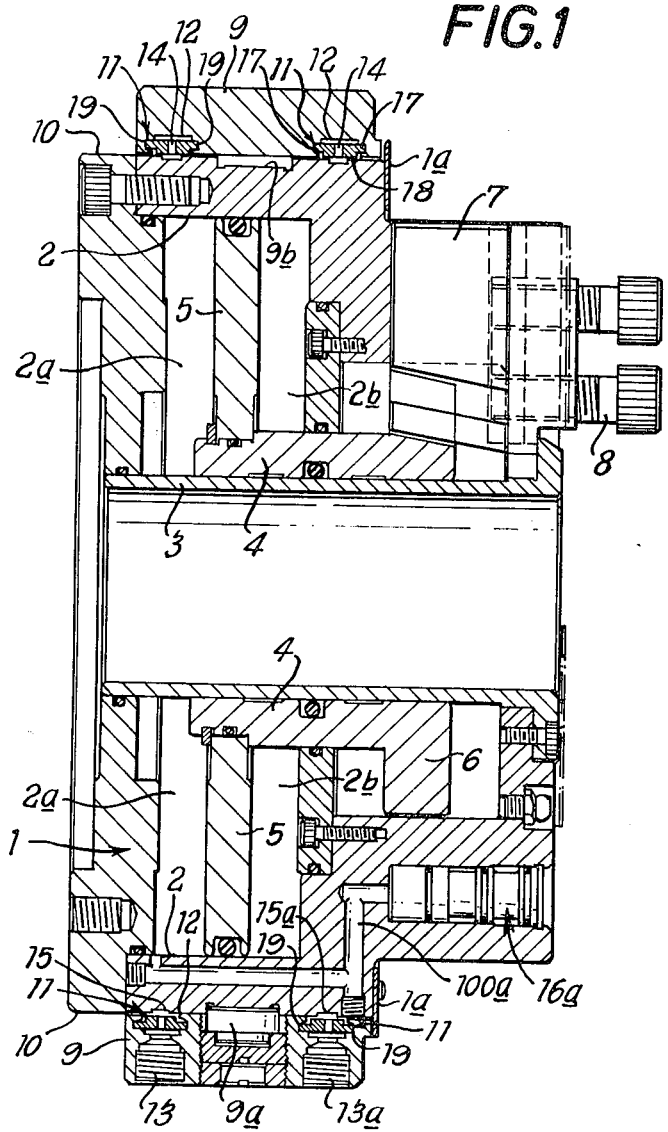
FIG. 1 is an axial section through a fluid pressure operated chuck of the type specified and in which the slip ring incorporates sealing rings in accordance with the present invention, the sealing rings being arranged to exhibit radial displacement to effect sealing between the slip ring and chuck body.
Figure 2:
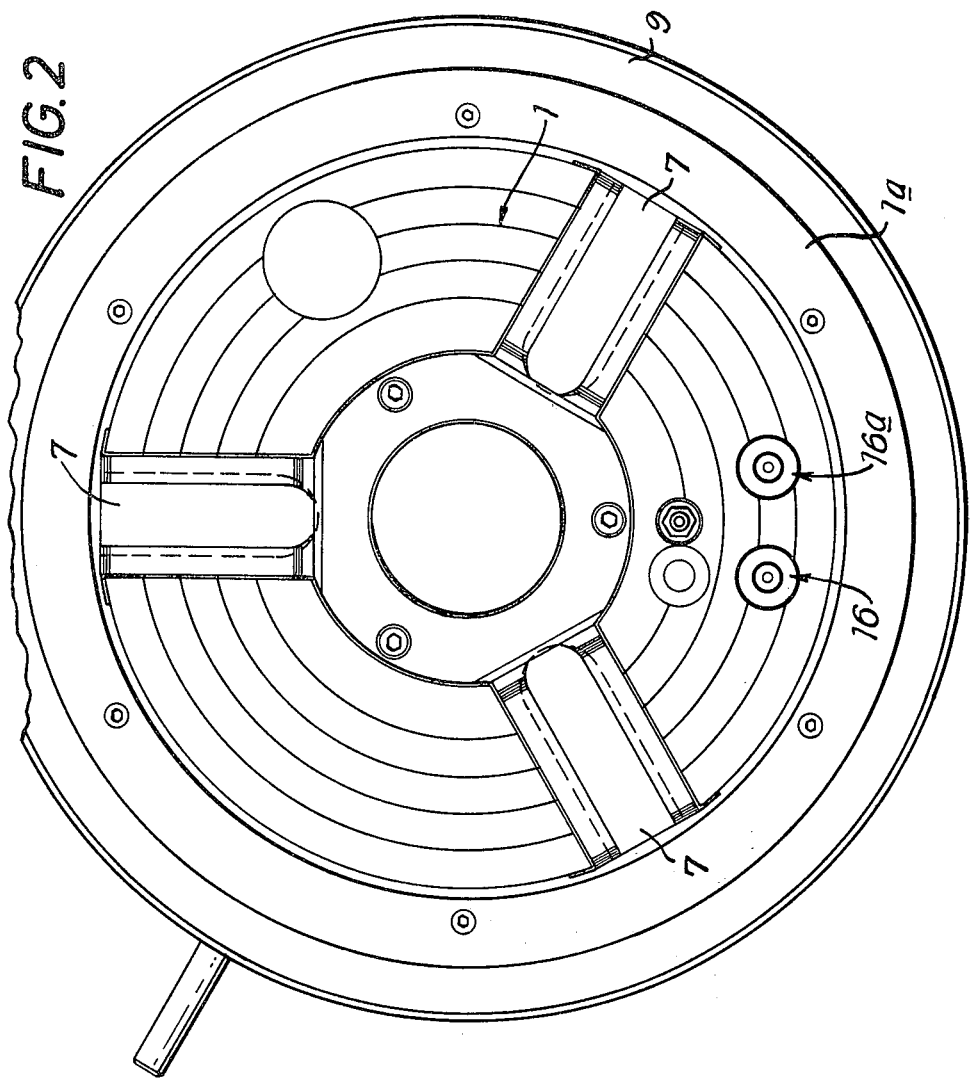
FIG. 2 is an end view of the chuck shown in FIG. 1 and illustrates the location for the gripping jaws.
Figure 5:
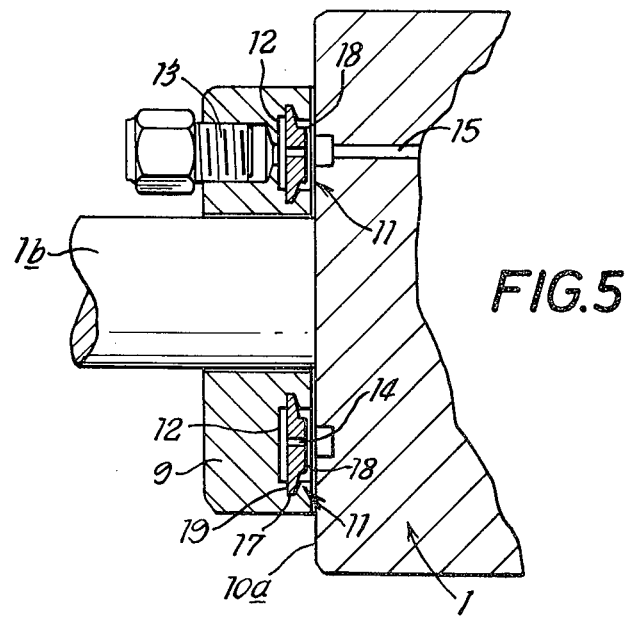
Figure 6:
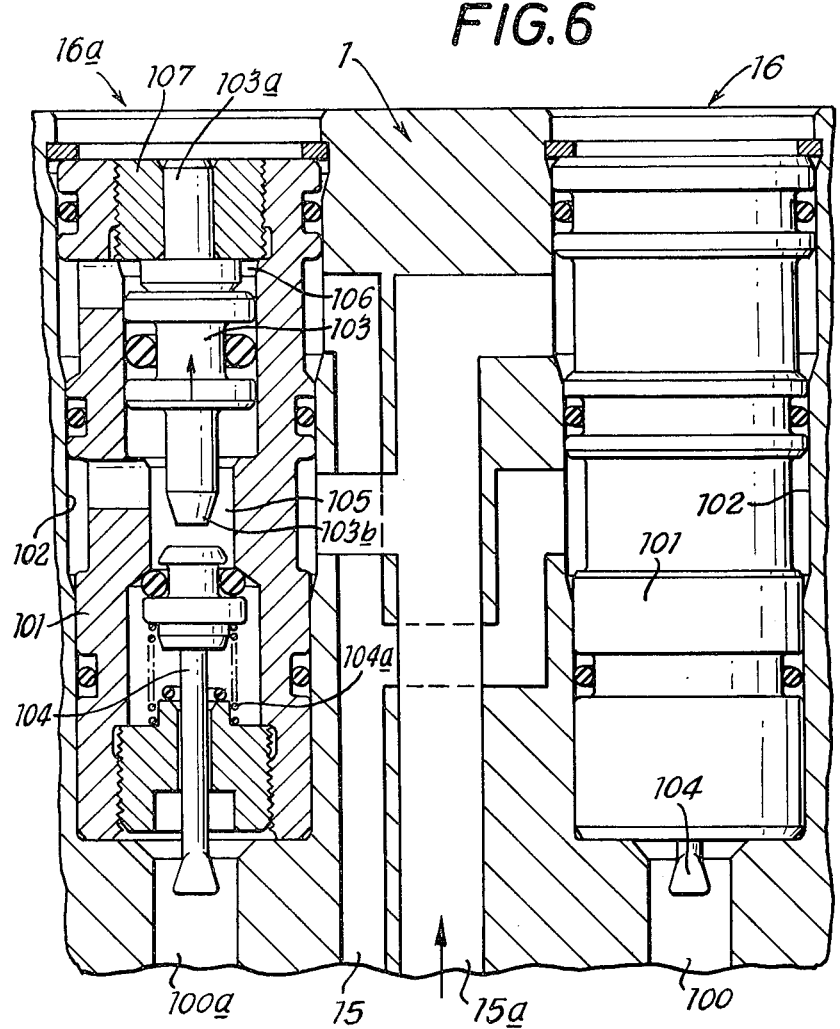

FIG. 5 is an axial section through part of an alternative form of fluid pressure operated chuck of the type specified which incorporates a sealing ring in accordance with the present invention and which sealing ring is intended to be displaced axially to effect sealing between slip ring and chuck body, and FIG. 6 illustrates, in part section, the valve means incorporated in the chuck shown in FIGS. 1 and 2. Where possible throughout the following description similar parts or members in each of the figures have been accorded the same references.

The chuck shown in FIGS. 1 and 2 comprises a body shown generally at 1 forming an annular piston cylinder 2 axially about a central tubular bush 3. The bush 3 provides a bearing for a coaxial sleeve 4 mounted on it. The sleeve 4 carries an annular piston 5 axially slidable in the piston cylinder 2 to form therein piston chambers 2a and 2b on opposite sides of the piston. The piston 5 is located towards one axial end of the sleeve 4 while the other axial end of the sleeve is provided with a radially outwardly extending flange portion 6. This flange portion has three radially extending and circumferentially spaced gaps formed in it and each side of such gap is provided with an axially inclined spline and parallel groove on and in each of the sides of each of three jaw carriers 7. The jaw carriers 7 are radially slidable in appropriate tracks in the chuck body 1 and to each of these is secured by bolts 8 a gripping jaw (not shown). By this arrangement, axial movements of the piston 5 and its carrier sleeve 4 are converted into radial movements of the jaw carriers 7 and the gripping jaws secured thereto.

The piston 5 double acting so that its movement is effected by air under pressure entering the chamber 2a or 2b on one side of the piston cylinder while the chamber 2b or 2a on the other side is exhausted. Since the chuck body 1 is to be axially rotated, air under pressure is fed to the piston cylinder from a stationary annular slip ring 9 mounted about a peripheral cylindrical surface 10 of the chuck body. The slip ring 9 is coaxial with the axis of rotation of the chuck body and is restrained from axial movement over the chuck body by a low friction plug 9a which is secured to the slip ring an slides in an annular external recess 9b in the surface 10 of the chuck body.

Carried by the slip ring are a pair of axially spaced sealing rings each of which is shown generally at 11. These sealing rings are of a resilient material such as neoprene rubber and are interposed between the slip ring 9 and the surface 10 of the chuck body in annular recesses 12 in the slip ring. Each of the annular recesses 12 on the side of its sealing ring 11 remote from the surface 10 communicates with an inlet port 13, 13a to which in intended to be coupled an air pressure line. Each of the sealing rings 11 has a circumferentially spaced array of throttle passages 14 through which air under pressure passing from the port 13, 13a can flow into air passages 15, 15a respectively in the chuck body. These passages 15, 15a communicate with control valves 16, 16a.

The valve 16 serves to control the flow of air under pressure into, and exhaust from, a passage 100 (see FIG. 6) which communicates with the piston chamber 2b while the valve 16a serves to control the flow of air under pressure into, and exhaust from, a passage 100a which communicates with the piston chamber 2a. The valves 16, 16a are of similar construction and each comprises a cylindrical body 101 which is located and sealed in a bore 102 in the chuck body 1. The bores 102 are located in side-by-side relationship extending axially of the chuck body and open into the front (jaw) end face of the chuck body (see FIG. 2). Each of the bodies 101 is hollow and houses an axially slidable spool 103 and an axially movable valve member 104 which is in axial alignment with the spool 103.

Formed axially between the spool 103 and valve member 104 is a pressure chamber 105. The chamber 105 of valve 16 communicates with air passage 15 while the chamber 105 of valve 16a communicates with air passage 15a. Formed between the end of the spool axially remote from the chamber 105 is a second pressure chamber 106. The chamber 106 of valve 16 communicates with air passage 15a while the chamber 106 of valve 16a communicates with air passage 15. The end of spool 103 remote from chamber 105 is capable of abutting a separate rod or spigot 103a which extends in sealed manner through, and is slidable in, a fixed collar 107 screwed in the body 101 so that the spool is accessible from the front end of the chuck body by way of the rod or spigot 103a. The opposite end of the spool 103 in the chamber 105 is provided with an axially extending abutment 103b which, on axial displacement of the spool downwardly in the drawings, abuts and similarly displaces the valve member 104. The valve member 104 is spring loaded at 104a so that it nomally closes communication between the chamber 105 and the passage 100 and 100a associated with its respective valve 16 or 16a. On axial displacement of the valve member 104 downwardly in the drawing communication is opened between the chamber 105 and the passage 100 or 100a as the case may be.

In operation of the valves 16, 16a, if air under pressure is introduced by way of the input 13a into passage 15a while input 13 and thereby passage 15 are open to exhaust, air pressure in chamber 105 of valve 16a acts on spool 103 to urge the spool 103 upwardly in the drawing while the valve member 104 of that valve is displaced downwardly against its spring loading to admit air under pressure into the piston chamber 2a. Simultaneously air pressure from passage 15a enters chamber 106 of valve 16 and acts on spool 103 of that valve to urge the spool 103 downwardly and abut the valve member 104 causing the latter to be displaced against its spring loading and open communication between passage 100 (and thereby piston chamber 2b) and chamber 105 which latter is open to exhaust by way of passage 15. Consequently with piston chamber 2a pressurised and piston chamber 2b exhausted the piston 5 is moved in one sense of axial direction to open or close the jaws as the case may be. Alternatively, if air under pressure is introduced by way of the input 13 into passage 15 while input 13a and thereby passage 15a are open to exhaust, it will be apparent that the two valves operate in the reverse sense to that above described so that the piston chamber 2b is pressurised while the piston chamber 2a is exhausted and the piston 5 is moved in the opposite sense axial direction to close or open the jaws as the case may be.

While the valves 16, 16a operate automatically to effect movement of the piston on the introduction of air under pressure through an appropriate one of the inlets 13 or 13a while the other inlet is open to exhaust, there is provision to effect exhaustion (or a reduction of air pressure) in one or other of the piston chambers 2a, 2b manually. This can be achieved in the case of either valve by manually displacing the spool 103 downwardly in the drawing (by access through the front face of the chuck to the spigot 103a). On such displacement of the spool, the latter abuts and causes the valve member 104 to be displaced downwardly thereby opening communication from the passage 100 or 100a (and thereby piston chamber 2b or 2a respectively) as the case may be to the chamber 105 which latter will communicate with exhaust by way of passage 15 or 15a as the case may be. This facility for manual exhaustion of either piston chamber permits a lower operating pressure to be introduced if the need arises; further, it may serve as a safety precaution (for example in the event of dismantling the chuck for servicing) to ensure that there is no compressed air trapped in the chuck.

In the embodiment shown in FIGS. 1 and 2, each sealing ring 11 is of squat T shape in radial section with the flanges at the head of the providing marginal edge parts 17 and the broad base face at the stem of the T forming a sealing contact face 18. Each annular recess 12 is provided in its opposed side walls with a pair of axially opposed annular grooves 19 which open into the annular recess. During fitting, the sealing ring is deformed in section until, by virtue of its resilience, the flanges 17 spring as a close fit into engagement with the opposed grooves 19. By this arrangement, when air under pressure is admitted through the inlet ports 13, the annular central portions of the sealing rings are displaced radially inwardly until the contact faces 18 engage in face-to-face abutment with the cylindrical surface 10 of the chuck body while the flanges 17 remain in the grooves 19. In this way the sealing rings 11 provide a seal between the slip ring 9 and the chuck body 1 during the flow of air through the passages 14 into the piston cylinder for effecting movement of the clamping jaws. It will be noted from FIG. 1 that the radially inner annular sides of the grooves 19 are chamfered to provide clearance with the adjacent sides of the flanges 17 which are received in the respective grooves; such chamfering serves both to provide a lead-in surface for facilitating fitting of the sealing rings into their respective annular recesses and to ensure that on radially inward displacement by air pressure of the sealing rings, the flanges 17 are urged into face-to-face abutment with their respectively opposed chamfered surface to provide an efficient seal between the annular edges of the sealing ring and the slip ring 9.

The sealing rings in FIG. 1 are shown in the normal position which they will adopt when not subjected to air under pressure through the ports 13 and clearance is provided between the contact faces 18 and the surface 10 of the chuck body so permitting the latter to rotate freely within the slip ring. The aforementioned normal position of the sealing rings will be adopted in the absence of air under pressure in the ports 13 by virtue of the resilience of the material from which the sealing rings are made. However, movement of the sealing rings from their sealing position (in which the contact faces 18 abut the surface 10 of the chuck body) to the normal position shown in FIG. 1 may be assisted by exhaust back pressure caused by air flowing through the lines 15 and acting on the contact faces 18 when the ports 13 are open to exhaust.

In FIGS. 1 and 2, an annular plate 1a is shown bolted to the chuck body 1. This plate 1a is located on the side of the slip ring 9 adjacent to the jaw end of the chuck and radially overlies the clearance between the slip ring and chuck body; the purpose of the plate 1a is to prevent ingress of swarf between the slip ring and chuck body.

Figure 3:
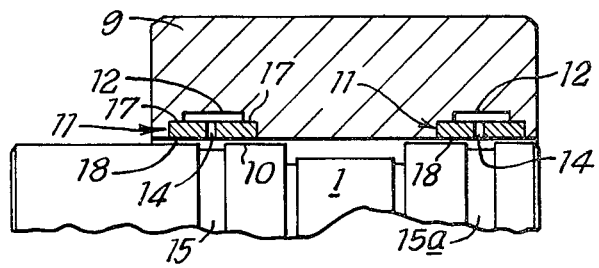
FIGS. 3 and 4 illustrate part sections through part of a chuck similar to that shown in FIG. 1 and show alternative arrangements for the sealing rings in accordance with the present invention.

In the embodiment shown in FIG. 3 each of the sealing rings 11 is of rectangular shape in radial cross-section and is secured in its respective annular recess 12 of the slip ring 9 by locating its marginal edge parts 17 on complementary annular rebates or shoulders of the slip ring to which those edge parts are adhesively bonded. When these sealing rings are subjected to air under pressure on the sides thereof remote from the chuck body 1, the central portions of the sealing rings flex radially inwardly until the contact face 18 abuts the cylindrical surface 10 of the chuck body in face-to-face engagement to effect sealing in a similar manner to that described with reference to FIGS. 1 and 2.

Figure 4:
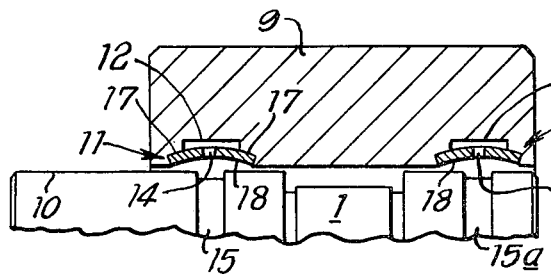

In the embodiment shown in FIG. 4 each sealing ring 11 is again of rectangular shape in radial section while the mouth portion of each annular recess 12 in the slip ring is shaped to be of dove-tail formation in radial section. During fitting, each sealing ring is deformed in cross-section so that its edge parts 17 with the dove-tailed mouth portion of its respective annular recess 12 and the sealing ring assumes a concavo-convex shape in section with a concave contact face 18. While the marginal edge parts 17 of the sealing ring may be adhesively secured in the dove-tailed mouth portion of its respective recess 12, the interlocking between the marginal edge parts and the dove-tailing of the recess 12 should provide sufficient securing for the sealing rings. In use, and when the sealing rings shown in FIG. 4 are subjected to air under pressure, their central portions are displaced radially inwardly to effectively straighten their shape in radial section until their contact faces 18 abut and effect sealing against the surface 10 of the chuck body 1. It will be apparent that during straightening of the radial section of the sealing rings the marginal edge parts thereof are increasingly urged into engagement with the dove-tailed section of the recess 12 to improve sealing between the sealing rings and the slip ring 9.

If required the cross sectional shape of sealing ring shown in FIGS. 1 and 2 can be secured to the slip ring in a similar manner to the embodiment shown in FIG. 3 or in FIG. 4 and vice versa.

In each of the embodiments above described and illustrated, each sealing ring undergoes radial displacement relative to the axis of rotation of the chuck body to effect sealing between the slip ring 9 and the chuck body 1. Such form of displacement is by no means essential to the present invention and in the embodiment illustrated in FIG. 5 the annular sealing ring 11 is intended to undergo axial displacement to effect sealing between the slip ring and the chuck body 1. In this latter embodiment the slip ring 9 exhibits axial rotation on an appropriate extension 1b of the chuck body at a position immediately adjacent to a radially extending face 10a of the chuck body 1. The annular recess 12 in the slip ring 9 opens axially towards the face 10a and secured therein is a slip ring 11. This slip ring is similar in form, mounting and operation to that above described with reference to FIG. 1 except that the stem of its squat T radial section is directed in the axial direction (rather than in the radial direction as per the FIG. 1 embodiment), so that its contact face 18 lies substantially in a radial plane and moves into abutment with the face 10a of the chuck body when the sealing ring is subjected to air under pressure through the slip ring.

If required the slip ring arrangement shown in FIG. 5 can be provided with a similar sealing ring and means of securing such ring as above described with reference to FIG. 3 or FIG. 4.

What we claim is:

1. A fluid pressure operated chuck comprising a chuck body rotatable about an axis, a piston mounted in the chuck body for axial displacement therein, a set of jaws mounted for radial movement on the chuck body between work clamping and work release positions, means interconnecting said set of jaws and said piston so that the former move to at least one of its positions in response to movement of the latter, valve means in the chuck body; a stationary slip ring surrounding the chuck body, said ring having an annular recess, a resilient sealing ring housed in said recess, said sealing ring having a cross sectional shape providing a central annular sealing contact face and marginal peripheral edge parts and at least one opening in the central annular sealing contact face; annular passage means in the chuck body in registry with said annular recess and said sealing ring and communicating with a working face of said piston through said valve means, said central annular sealing contact face being forced under fluid pressure into face-to-face contact with the chuck body during actuation of the piston, so that the fluid power may pass from the annular recess in the slip ring, through the opening in the central annular sealing contact face, through the passage means in the chuck body and the control valve means; marginal grooves being provided in the slip ring on either side of said recess, the marginal peripheral edge parts of said sealing ring being tightly fit in said marginal grooves, said sealing ring being of such width and resilience that said edge parts spring into engagement with the marginal grooves, said contact face having a concave annular profile relative to the chuck body in the absence of fluid pressure in the recess on the side of the sealing ring remote from said face, said annular recess in the slip ring comprising a dove-tailed cross sectional portion with which the marginal edge parts of the sealing ring engage so that the sealing ring normally assumes a substantially concave-convex cross-sectional formation.

2. A fluid pressure operated chuck comprising a chuck body rotatable about an axis, a piston mounted in the chuck body for axial displacement therein, a set of jaws mounted for radial movement on the chuck body between work clamping and work release positions, means interconnecting said set of jaws and said piston so that the former move to at least one of its positions in response to movement of the latter, valve means in the chuck body; a stationary slip ring surrounding the chuck body, said ring having an annular recess, a resilient sealing ring housed in said recess, said sealing ring having a cross sectional shape providing a central annular sealing contact face and marginal peripheral edge parts and at least one opening in the central annular sealing contact face; annular passage means in the chuck body in registry with said annular recess and said sealing ring and communicating with a working face of said piston through said valve means, said central annular sealing contact face being forced under fluid pressure into face-to-face contact with the chuck body during actuation of the piston, so that the fluid power may pass from the annular recess in the slip ring, through the opening in the central annular sealing contact face, through the passage means in the chuck body and the control valve means; marginal grooves being provided in the slip on either side of said recess, the marginal peripehral edge parts of said sealing ring being tightly fit in said marginal grooves, said sealing ring being of such width and resilience that said edge parts spring into engagement with the marginal grooves, said piston being double acting and defining with its cylinder two piston chambers located one on each side of the piston; two discrete fluid passages in the chuck body communicating one with each of said chambers and through which said chambers are pressurized or exhausted to effect movement of the piston; said valve means comprising two discrete valves associated one with each of the said passages to the piston chambers, said valves controlling fluid flow to, and exhaustion of, the piston chambers through said discrete fluid passages with which they are respectively associated; said slip ring providing two discrete fluid inlets each of which communicates by way of a said resilient sealing ring housed in an annular recess of said slip ring and by way of passage means in said chuck body with the two valves, said passage means and two valves being so arranged that with a first fluid inlet connected to a source of fluid pressure and the second fluid inlet connected to exhaust, both of said valves are simultaneously controlled by said fluid pressure so that a first valve admits fluid under pressure into its respectively associated piston chamber while the second valve opens communication between its respectively associated piston chamber and exhaust at the second fluid inlet and vice versa when the first fluid inlet is connected to exhaust and the second fluid inlet is connected to a source of fluid under pressure, said two valves being of similar construction and each valve comprises a spool slidable in a housing and a valve member and means spring biasing said valve member; said valve member being spring biased to close communication between a first chamber and the piston chamber associated with that valve; said spool partly defining a second chamber in said housing and being slidable to engage said valve member and displace that valve member against its spring biasing means to open communication between the first chamber and the piston chamber associated with that valve; said first chamber of one valve and the said second chamber of the second valve being in communication with a first fluid inlet and the said second chamber of said one valve and the said first chamber of the said second valve being in communication with the second fluid inlet, the arrangement being such that when one of said fluid inlets is connected to fluid under pressure and the other is exhausted, fluid pressure in the said first chamber associated with the pressurised inlet displaces the respectively associated valve member of one valve to admit fluid under pressure into the piston chamber associated with that valve while fluid under pressure in the said second chamber associated with the pressurised inlet displaces the respectively associated spool of the other valve to engage and displace the valve member of the said other valve to open communication between the piston chamber associated with said other valve and the said first chamber of said other valve and thereby open communication between the piston chamber associated with said other valve and exhaust in the first chamber of said other valve.

3. A fluid pressure operated chuck as claimed in claim 2 wherein the spool and valve member in each valve are in axial alignment so that, on displacement of the spool by fluid pressure in the second chamber of said valve, an end of the spool abuts the valve member of that valve to effect displacement of that valve member against its bias spring.

4. A fluid pressure operated chuck as claimed in claim 2 wherein said first chamber in each valve is formed axially between the spool and valve member.

5. A fluid pressure operated chuck as claimed in claim 3 wherein the spool and valve member are mounted in the chuck body with their axes substantially parallel with the axis of rotation of the chuck body.

6. A fluid pressure operated chuck as claimed in claim 2 wherein said spools are accessible for manual displacement for engaging the respectively associated valve members and for displacing said valve members against said spring biasing means to permit manual exhausting of fluid pressure from the piston chamber.

7. A fluid pressure operated chuck as claimed in claim 6 wherein the spool and valve member are mounted in the chuck body with their axes substantially parrallel with the axis of rotation of the chuck body and wherein the spool and valve member of each valve are housed in a bore in the chuck body which bore opens into a front end face of the chuck body through which said spool is accessible for manual displacement.

8. A fluid pressure operated chuck comprising a chuck body rotatable about an axis, a piston mounted in the chuck body for axial displacement therein, a set of jaws mounted for radial movement on the chuck body between work clamping and work release positions, means interconnecting said set of jaws and said piston for moving said jaws to at least one of its positions in response to movement of the piston; valve means in the chuck body; a stationary slip ring surrounding the chuck body, said ring having an annular recess, a resilient sealing ring housed in said recess, said sealing ring having a cross sectional shape of T-form of which the portion of the ring forming the base of the stem of the T provides a central annular sealing contact face and the portions of the ring forming opposed flanges of the T provide marginal peripheral edge parts, and at least one opening in the central annular sealing contact face; annular passage means in the chuck body in registry with said annular recess and said sealing ring and communicating with a working face of said piston through said valve means, said central annular sealing contact face being formed under fluid pressure into face-to-face contact with the chuck body during actuation of the piston, so that the fluid power may pass from the annular recess in the slip ring, through the opening in the central annular sealing contact face, through the passage means in the chuck body and the control valve means; marginal grooves being provided in the slip ring on either side of said recess, the marginal peripheral edge parts of said sealing ring being tightly fit in said marginal grooves at a position radially remote from the surface of the chuck body that the contact face engages, said sealing ring being of such width and resilience that said edge parts spring into engagement with the marginal grooves, and are maintained thereby out of engagement with the chuck body while permitting radial displacement of the central annular sealing contact face.

9. A fluid pressure operated chuck as claimed in claim 8 wherein the sealing ring is additionally secured in the annular recess of the slip ring by the said marginal edge parts being adhesively secured in the opposed grooves.

10. A fluid pressure operated chuck as claimed in claim 8 wherein the sealing ring is of rectangular cross-section.

11. A fluid pressure operated chuck as claimed in claim 8 wherein the contact face has a concave annular profile relative to the chuck body in the absence of fluid pressure in the recess on the side of the sealing ring remote from said face.

12. A fluid pressure operated chuck as claimed in claim 8 wherein said grooves have on the sides thereof adjacent to the chuck body a chamfer providing a tapering clearance between the said sides of the grooves and the sealing ring marginal edge parts respectively received in said grooves.

13. A fluid pressure operated chuck as claimed in claim 8 in which the piston is double acting and defines with its cyclinder two piston chambers located one on each side of the piston; two discrete fluid passages in the chuck body communicating one with each of said chambers and through which said chambers are pressurised or exhausted to effect movement of the piston; wherein the valve means comprises two discrete valves associated one with each of the said passages to the piston chambers, said valves controlling fluid flow to, and exhaustion of, the piston chambers through said discrete fluid passages with which they are respectively associated; said slip ring providing two discrete fluid inlets each of which communicates by way of a said resilient sealing ring housed in an annular recess of said slip ring and by way of passage means in said chuck body with the two valves, and wherein the said passage means and two valves are so arranged that with a first fluid inlet connected to a source of fluid pressure and the second fluid inlet connected to exhaust, both of said valves are simultaneously controlled by said fluid pressure so that a first valve admits fluid under pressure into its respectively associated piston chamber while the second valve opens communication between its respectively associated piston chamber and exhaust at the second fluid inlet and vice versa when the first fluid inlet is connected to exhaust and the second fluid inlet is connected to a source of fluid under pressure.

14. A fluid pressure operated chuck comprising an axially rotatable chuck body and a piston mounted in a cylinder in said chuck body to be axially displaceable therein under fluid pressure; intermediate means operated by axial movement of the piston, a set of movable work gripping jaws on the chuck body actuated by said intermediate means having radial movement on said chuck body to clamp or release a workpiece;

a stationary slip ring disposed peripherally about the chuck body, said slip ring defining an annular recess having marginal grooves, resilient sealing ring means housed in said recess, said sealing means having a cross sectional shape of T-form of which the portion of the ring forming the base of the stem of the T provides a central annular sealing contact face with at least one opening therein, and the portion of the ring forming opposed flanges of the T provide marginal peripheral edge parts closely fitted in said marginal grooves at a position radially remote from the surface of the chuck body that the contact face engages;

control valve means in the chuck body;

passage means in said slip ring to provide fluid pressure on the outer surface of said sealing ring and at one said opening therein to cause displacement by fluid pressure of said sealing contact face of said sealing ring means into contact with the chuck body;

passage means in said chuck body between one of said openings in said sealing ring and said control valve means; and passage means between said valve means and said cylinder so that fluid power may be provided through the passage means in the slip ring, through one of the openings in the central annular sealing contact face, through the passage means in the chuck body to the control valve means, and through the passage from said control valve means to said cylinder to displace said piston, said sealing ring being of such width and resilience so that said edge parts spring into engagement with said marginal grooves and engage with said chuck body with its sealing face to form a fluid seal with said chuck body when fluid pressure is applied to the outer surface of said sealing ring to displace the piston and when fluid pressure is removed from said outer surface said ring being maintained out of engagement with said chuck body while permitting radial displacement of the central annular sealing contact face to cause said sealing face to disengage said chuck body to allow free rotation of said chuck body.

15. A fluid pressure operated chuck as claimed in claim 14 in which said piston is double acting and said cylinder defines two piston chambers located one on each side of the piston; and said passage means between the valve means and cylinder comprises two discrete fluid passages communicating one with each of said chambers and through which said chambers are pressurized or exhausted to effect movement of the piston, and wherein said valve means comprises two discrete valves associated one with each of the said discrete fluid passages to the piston chambers, said valves controlling fluid flow to, and exhaustion of, the piston chambers through said discrete fluid passages with which they are respectively associated; and wherein said slip ring has a second annular recess having marginal grooves, a second resilient sealing ring disposed in said second annular recess having an opening therein and a central annular sealing contact face and marginal peripheral edge parts disposed in the marginal grooves of said second annular recess, said chuck body having a second passage therein between one of said openings in said second sealing ring and one of said valves and wherein said slip ring has two discrete fluid inlets each of which communicates with one of said two valves by way of one of said resilient sealing rings housed in said annular recesses of said slip ring and by way of one of said passage means in said chuck body, so that with said first fluid inlet connected to a source of fluid pressure and the second fluid inlet connected to exhaust, said first valve admits fluid under pressure into its respectively associated piston chamber while the second valve opens communication between its respectively associated piston chamber and exhaust at the second fluid inlet so as to displace said piston within said cylinder by pressurization of one of said chambers.

* * * * *